United States Patent [19]

Guttag

[11] Patent Number: 4,952,426

[45] Date of Patent: Aug. 28, 1990

[54] REDUCING CANCER RISK FROM NEWSPAPERS

[76] Inventor: Alvin Guttag, 6612 Whittier Blvd., Bethesda, Md. 20817

[21] Appl. No.: 213,342

[22] Filed: Jun. 30, 1988

[51] Int. Cl.$^5$ ............................ B05D 1/36; B05D 5/00
[52] U.S. Cl. ................................. 427/258; 270/20.1;
283/62; 427/288; 428/195
[58] Field of Search .................. 270/20.1; 283/23, 27,
283/28, 62; 427/258, 288, 391, 411; 101/483,
487, 488; 428/195

[56] References Cited

U.S. PATENT DOCUMENTS

| | | | |
|---|---|---|---|
| 2,696,168 | 12/1954 | Costello | 427/258 X |
| 2,974,058 | 3/1961 | Pihl | 427/288 X |
| 3,494,777 | 2/1970 | Talet et al. | 427/288 X |
| 3,632,367 | 1/1972 | Brown et al. | 427/258 |
| 4,170,681 | 10/1979 | Edwards et al. | 427/258 X |

Primary Examiner—Michael Lusignan
Attorney, Agent, or Firm—Cushman, Darby & Cushman

[57] ABSTRACT

The present invention provides a process for coating paper having printed ink on its surface which comprises applying and adhering a transparent plastic to said paper while said ink is wet. Preferably the paper used is newsprint and the ink used is carbon black.

The present invention also provides an article comprising paper, wet ink printed on said paper, and a transparent plastic coating over the wet ink and at least that portion of the paper containing said ink.

23 Claims, 1 Drawing Sheet

REDUCING CANCER RISK FROM NEWSPAPERS

BACKGROUND OF THE INVENTION

The printing ink on newspapers has a tendency to come off on the hands, especially while it is fresh, e.g. within the first two or three days. Not only is this messy but it is also dangerous after a prolonged exposure to the printing inks because they contain carbon black which has a number of carcinogens in it, for example benzopyrene and substituted benzopyrenes. The carcinogens are absorbed through the skin when the printing ink gets on the hands. Furthermore, some people are allergic to the printing ink.

The present invention (1) addresses the need of providing a covering for newsprint that prevents the ink from rubbing off on the hands of newspaper reader and (2) also provides a means to prevent exposure of allergic individuals to the printing ink.

SUMMARY OF THE INVENTION

The present invention provides a process for coating paper having printed ink on its surface which comprises applying and adhering a transparent plastic to said paper while said ink is wet. Preferably the paper used is newsprint and the ink used contains carbon black.

The present invention also provides an article comprising paper, wet ink printed on said paper, and a transparent plastic coating over the wet ink and at least that portion of the paper containing said ink.

THE DRAWINGS

DETAILED DESCRIPTION

Figure 1:
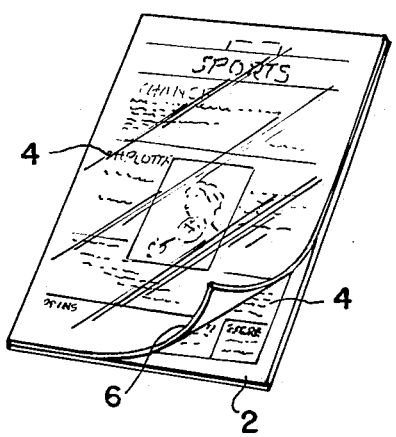
FIG. 1 shows a right-front perspective view of one embodiment of the invention with the thickness exaggerated to better illustrate the invention.
Figure 5:
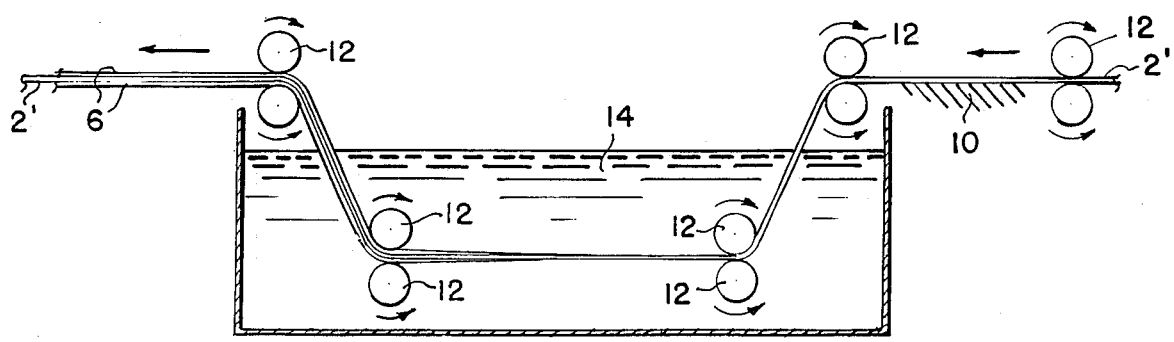
FIG. 5 is a schematic view showing one method for carrying out the process of the invention.

As shown in FIG. 1 the present invention envisions eliminating the problems with printing ink by covering the paper 2 having a printed portion 4 with clear plastic 6 promptly after printing or at least before the paper 2 is handled by a reader. The plastic can be applied in various ways. For example, after the paper is printed it can be passed through a bath of molten plastic so that both sides of the paper are coated as shown in FIG. 5. FIG. 5 shows a web of printed paper 2' traveling along a conveyer 10 and between rollers 12. As the web of paper 2' passes through a bath 14, the web 2' is coated on both sides with plastic 6. Another way of applying molten plastic to a web of printed paper is by spray-coating the plastic over the printed paper. The thickness of the coating when using a molten plastic process may be controlled by conventional means such as passing the coated paper under (if coated on one side) or between (if coated on both sides) one or more doctor blades.

Alternatively, the printed newspaper can have a thin film of plastic applied over the printed matter. The film in this case can be adhered to the paper by an adhesive e.g., at the corners or edges. Heat sensitive, pressure sensitive or moisture sensitive adhesives can be used for example. Alternatively the film is adhered simply by heating the edges of the plastic on top of the paper. As another alternative the entire surface of the plastic can be heated sufficiently to adhere to the paper.

Figure 2:
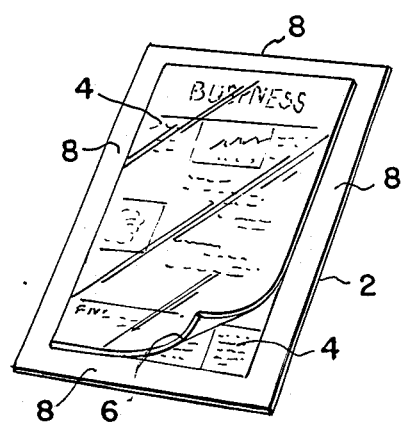
FIG. 2 shows a right-front perspective view of a second embodiment of the invention with the thickness exaggerated to better illustrate the invention.

As shown in FIG. 2 the plastic 6 need not cover the entire newspaper page 2 but only the printed portion 4 so that the borders 8 beyond the printed portion are free of the plastic 6.

Figure 3:
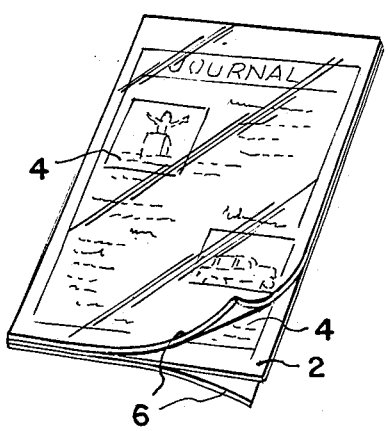
FIG. 3 shows a right-front perspective view of a third embodiment of the invention with the thickness exaggerated to better illustrate the invention.

FIG. 3 shows an embodiment of the invention in which both sides of a printed paper 2 are coated with plastic. Because printed papers, especially newspapers, are commonly printed on both sides, it is desirable that both sides of the paper 2 be coated with plastic 6.

Figure 4:
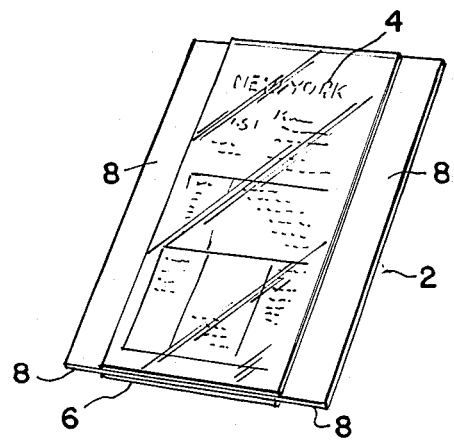
FIG. 4 shows a right-front perspective view of a fourth embodiment of the invention with the thickness exaggerated to better illustrate the invention.

FIG. 4 shows an embodiment of the invention in which the printed paper is coated with plastic 6 so that there are only two parallel borders 8 at the edge of each side of the paper 2 free of plastic. One way this embodiment may be produced is by using the process shown in FIG. 5 and masking the edges of the paper 2 while it is passed through the bath. One way to mask the edges of the paper to create plastic-free borders would to be to clamp the edges when the paper is put on the conveyer.

The plastic which is used may be heat shrinkable and the adherence of such a heat shrinkable plastic to the paper may be accomplished for example by lightly heating the plastic after applying the plastic to the paper. The plastic can be constrained to prevent too much shrinkage.

Preferably, the plastic is colorless, water-white, but may also be colored, e.g. green for a paper printed on St. Patrick's Day, pink for a paper printed on Valentine's Day. However, when the paper is colored, it is desirable that the color not be affected when the plastic is adhered to the paper.

The plastic should be thin, e.g. as thin as 0.1 mil, but can be thicker, as thick as up to 5 mils. Heat shrinkable oriented plastics normally can be used in the thinner ranges because of their strength. These oriented plastics can be either mono- or biaxially oriented. Typical oriented polymers are disclosed in U.S. Pat. No. 3,022,543 to Baird and 2,452,080 to Stephenson.

Typical plastics are linear polyethylene, crosslinked polyethylene, linear polypropylene, cross-linked polypropylene, ethylene-monolefin copolymer, e.g. ethylene-propylene copolymer, ethylene-butylene copolymer, ethylene-amylene copolymer, polyamylene, linear polyester, e.g. polyethylene terephthalate, polycarbonate, or a vinylidene chloride copolymer, e.g. vinylidene chloride-acrylonitrile copolymer.

Examples of heat shrinkable plastics include irradiated biaxially oriented polyethylene, chemically cross-linked biaxially oriented polyethylene, irradiated biaxially oriented polypropylene, irradiated monoaxially oriented polyethylene, unirradiated biaxially oriented polypropylene, biaxially oriented vinYlidene chloride acrylonitrile copolymer, biaxially oriented vinylidene chloride-vinyl chloride copolymer, mono- or biaxially oriented polyethylene terephthalate, e.g. Mylar.

As is customary in preparing newspapers, the paper can be in the form of a sheet of paper having a fold in the middle, thereby forming two pages on each side of the sheet. The plastic can cover both sides of the sheet and also the fold. When the plastic is applied in the form of a film, for example, the film can be applied before folding the paper if it is desired to include the fold in the portion of the paper protected by plastic.

As stated above the plastic is applied to the paper while the ink is still wet. It can be applied for example immediately after printing, 1 minute after printing, 5 minutes after printing, 10 minutes after printing, 1 hour after printing or 3 hours after printing.

A simple test for determining whether printed matter can be removed from paper because the ink is still wet is to apply a piece of Scotch ® tape to the printed matter and then remove the tape. If the ink is still wet, at least a portion of it will be transferred from the paper to the tape.

If desired, the plastic may be biodegradable. Thus, there can be used conventional biodegradable forms of polyethylene, polypropylene or polystyrene, e.g. see Hudgin et al., U.S. Pat. No. 4,495,311 which shows ultraviolet light degradable plastics. A newspaper covered with such a biodegradable film coating may be used as a mulch. Thus there can be used, for example, a polyethylene film made from the composition described in Example 5 of Hudgin et al..

The entire disclosures of all the United States patents mentioned above are hereby incorporated by reference.

I claim:

1. A process for coating paper having printed ink on its surface comprising applying and adhering a transparent plastic in matter or solid film form to said paper while said ink is wet.

2. The process of claim 1 wherein said plastic is a thermoplastic and is molten when said plastic is applied to said paper.

3. The process of claim 1 wherein said coating is applied so that two parallel borders on each side of the paper are free of plastic.

4. The process of claim 1 wherein said plastic is a solid thermoplastic film and is adhered to said paper by heating said thermoplastic while said thermoplastic is in contact with said paper.

5. The process of claim 1 wherein said thermoplastic is a film from about 0.1 mil to about 5 mils thick.

6. The process of claim 1 wherein said printed ink comprises carbon black.

7. The process of claim 1 wherein said paper is newsprint.

8. The process of claim 1 wherein said plastic is selected from the group consisting of linear polyethylene, cross-linked polyethylene, linear polypropylene, cross-linked polypropylene, and ethylenemonoolefin copolymer.

9. The process of claim 1 wherein said plastic is selected from the group consisting of ethylene-propylene copolymer, ethylene-butylene copolymer, ethylene-amylene copolymer, polyamylene, polyethylene terephthalate, polycarbonate, and a vinylidene chloride copolymer.

10. The process of claim 1 wherein said plastic is colored.

11. The process of claim 1 wherein said plastic is water-white.

12. The process of claim 1 wherein said coating is applied only to the printed portion of said paper and the borders beyond the printed portion are masked to render them free of said plastic.

13. The process of claim 1 including the steps of:
  (1) applying printing ink to pages of newprint,
  (2) coating the portions of the paper containing ink with the plastic while the ink is still wet and
  (3) assembling a newspaper from the coated pages.

14. The process of claim 13 including the step of folding the pages of the newpaper after applying the plastic coating.

15. A process according to claim 1 wherein the plastic is applied while the ink can still be removed from the paper in the Scotch tape test.

16. The process of claim 4 wherein said thermoplastic is a film from about 0.1 mil to about 5 mils thick.

17. The process of claim 4 wherein said printed ink comprises carbon black.

18. The process of claim 4 wherein said paper is newsprint.

19. The process according to claim 1 wherein the plastic is biodegradable.

20. The process according to claim 7 wherein the printed ink comprises carbon black and the plastic is in molten form.

21. The process according to claim 14 further comprising coating with the plastic that portion of the paper that is to be folded prior to folding the pages.

22. The process according to claim 1 wherein said plastic is applied to and adhered to both sides of said paper.

23. The process according to claim 22 wherein said printed ink comprises carbon black.

* * * * *

UNITED STATES PATENT AND TRADEMARK OFFICE
CERTIFICATE OF CORRECTION

PATENT NO. :       4,952,426
DATED      :       August 28, 1990
INVENTOR(S) :      Guttag It is certified that error appears in the above-identified patent and that said Letters Patent is hereby corrected as shown below:

Column 3, line 28:
Claim 1, line 3, delete "matter" and insert therefor --molten--.

Signed and Sealed this

Eleventh Day of February, 1992

Attest:

HARRY F. MANBECK, JR.

*Attesting Officer*      *Commissioner of Patents and Trademarks*